(12) United States Patent
Shimizu (10) Patent No.: US 7,673,452 B2
(45) Date of Patent: Mar. 9, 2010

(54) MOTOR-DRIVEN SUPERCHARGER

(75) Inventor: Masahiro Shimizu, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 177 days.

(21) Appl. No.: 11/617,247

(22) Filed: Dec. 28, 2006

(65) Prior Publication Data

US 2007/0169747 A1 Jul. 26, 2007

(30) Foreign Application Priority Data

Jan. 24, 2006 (JP) ............................. 2006-015261

(51) Int. Cl.
| | |
|---|---|
| F02B 33/44 | (2006.01) |
| F02B 37/00 | (2006.01) |
| F02B 37/10 | (2006.01) |
| F02B 37/04 | (2006.01) |
| F02B 39/00 | (2006.01) |
| H02K 5/20 | (2006.01) |
| H02K 5/18 | (2006.01) |
| H02K 9/00 | (2006.01) |
| H02K 9/19 | (2006.01) |
| H02K 7/18 | (2006.01) |

(52) U.S. Cl. ............................ 60/608; 60/607; 290/52; 310/54; 310/55

(58) Field of Classification Search ........... 60/607–609; 417/406–409, 366, 368–370, 423.8; 290/52; 310/54–55; F02B 39/00, 37/10, 37/04; H02K 5/20, H02K 5/18, 9/00, 9/19

See application file for complete search history.

(56) References Cited

U.S. PATENT DOCUMENTS

| | | | |
|---|---|---|---|
| 3,675,056 A | * 7/1972 | Lenz ........................... 310/54 |
| 3,742,123 A | 6/1973 | Haub, Jr. | |
| 3,778,194 A | 12/1973 | Miller et al. ................. 417/407 |
| 3,927,530 A | * 12/1975 | Braun ........................... 60/608 |
| 4,253,031 A | * 2/1981 | Frister .......................... 290/52 |
| 4,301,375 A | * 11/1981 | Anderson ...................... 290/52 |
| 4,745,755 A | 5/1988 | Kawamura ..................... 60/608 |
| 4,757,686 A | 7/1988 | Kawamura et al. ............. 60/608 |
| 4,833,887 A | 5/1989 | Kawamura et al. ............. 60/608 |

(Continued)

FOREIGN PATENT DOCUMENTS

CA 2068369 A * 11/1992

(Continued)

OTHER PUBLICATIONS

Machine translation of JP 2000-130176 A.*

(Continued)

*Primary Examiner*—Thai Ba Trieu
(74) *Attorney, Agent, or Firm*—Griffin & Szipl, P.C.

(57) ABSTRACT

A motor-driven supercharger of the invention is provided with a cooling fluid flow rate adjusting device (a flow rate adjuster (37) and a controller (40)) capable of adjusting a flow rate of a cooling fluid. On the basis of the flow rate adjuster (37) and the controller (40), a flow rate of a cooling fluid (41) is set to a first flow rate (a large flow rate) for cooling an electric motor (20) in a state where a temperature difference obtained by subtracting a temperature of the cooling fluid (41) from a temperature of the electric motor (20) is equal to or more than a predetermined temperature equal to or more than zero, and the flow rate of the cooling fluid (41) is set to a second flow rate (a small flow rate) which is smaller than the first flow rate and is for suppressing a heating effect to the electric motor (20) in a state where the temperature difference is lower than a predetermined temperature equal to or more than zero.

2 Claims, 3 Drawing Sheets

U.S. PATENT DOCUMENTS

| | | | |
|---|---|---|---|
| 5,121,605 A | 6/1992 | Oda et al. | 60/608 |
| 5,323,613 A | 6/1994 | Akiyama | 60/608 |
| 5,587,332 A | 12/1996 | Chang et al. | |
| 5,605,045 A * | 2/1997 | Halimi et al. | 60/607 |
| 5,834,117 A | 11/1998 | Onishi | |
| 5,857,332 A | 1/1999 | Johnston et al. | 60/607 |
| 5,870,894 A | 2/1999 | Woollenweber et al. | 60/607 |
| 5,904,471 A | 5/1999 | Woollenweber et al. | 417/371 |
| 5,906,098 A * | 5/1999 | Woollenweber et al. | 60/608 |
| 6,032,466 A | 3/2000 | Woollenweber et al. | 60/607 |
| 6,102,672 A * | 8/2000 | Woollenweber et al. | 417/366 |
| 6,129,524 A * | 10/2000 | Woollenweber et al. | 417/366 |
| 6,145,314 A | 11/2000 | Woollenweber et al. | 60/607 |
| 6,160,332 A * | 12/2000 | Tsuruhara | 310/54 |
| 6,218,747 B1 * | 4/2001 | Tsuruhara | 310/54 |
| 6,257,834 B1 | 7/2001 | Bremer et al. | 417/406 |
| 6,278,199 B1 | 8/2001 | Grant et al. | |
| 6,293,769 B1 | 9/2001 | Radermacher et al. | 417/357 |
| 6,416,281 B1 | 7/2002 | Bremer et al. | 415/116 |
| 6,449,950 B1 | 9/2002 | Allen et al. | 60/607 |
| 6,609,375 B2 * | 8/2003 | Allen et al. | 60/608 |
| 6,647,724 B1 | 11/2003 | Arnold et al. | 60/608 |
| 6,668,553 B1 | 12/2003 | Ghizawi | 60/605.3 |
| 6,768,237 B1 * | 7/2004 | Schroedl | 310/114 |
| 6,871,499 B1 | 3/2005 | Allen et al. | 60/608 |
| 6,986,648 B2 | 1/2006 | Williams et al. | 417/370 |
| 7,010,916 B2 | 3/2006 | Sumser et al. | 417/406 |
| 7,056,103 B2 * | 6/2006 | LaRue | 417/407 |
| 7,352,077 B2 * | 4/2008 | Shibui et al. | 290/52 |
| 7,360,361 B2 | 4/2008 | Prusinski et al. | 60/608 |
| 7,458,214 B2 | 12/2008 | Philippe | 60/608 |
| 2003/0051475 A1 | 3/2003 | Allen et al. | 60/608 |
| 2003/0118461 A1 | 6/2003 | Hodapp et al. | 417/423.12 |
| 2005/0082941 A1 | 4/2005 | Iida et al. | 417/423.1 |
| 2006/0081226 A1 * | 4/2006 | Bolz | 123/565 |
| 2006/0123783 A1 | 6/2006 | Philippe | 60/607 |
| 2006/0245913 A1 | 11/2006 | Thiele et al. | 415/116 |
| 2007/0036664 A1 * | 2/2007 | Shibui et al. | 417/407 |

FOREIGN PATENT DOCUMENTS

| | | |
|---|---|---|
| CH | 266731 | 2/1950 |
| DE | 4115273 | 6/1992 |
| DE | 10156704 | 5/2003 |
| DE | 10022113 | 11/2005 |
| DE | 10 2005 052 363 | 5/2007 |
| EP | 0079100 | 5/1983 |
| EP | 0212988 | 3/1987 |
| EP | 0304259 | 2/1989 |
| EP | 1348848 A2 * | 10/2003 |
| FR | 2859499 | 3/2005 |
| GB | 2021874 | 12/1979 |
| GB | 2162377 A * | 1/1986 |
| JP | 58-124024 | 7/1983 |
| JP | 01-019122 | 1/1989 |
| JP | 01171006 A * | 7/1989 |
| JP | 02-099722 | 4/1990 |
| JP | 03-138430 | 6/1991 |
| JP | 4-119624 | 10/1992 |
| JP | 05199708 | 8/1993 |
| JP | 06-288242 | 10/1994 |
| JP | 06-346748 | 12/1994 |
| JP | 07-102988 | 4/1995 |
| JP | 10-299500 | 11/1998 |
| JP | 11-182259 | 7/1999 |
| JP | 2000-110577 | 4/2000 |
| JP | 2000-130176 | 5/2000 |
| JP | 2000-145468 | 5/2000 |
| JP | 2000-514987 | 11/2000 |
| JP | 2001-295655 | 10/2001 |
| JP | 2001-527613 | 12/2001 |
| JP | 3389748 | 3/2003 |
| JP | 2003-232340 | 8/2003 |
| JP | 2003-293785 | 10/2003 |
| JP | 2004-003420 | 1/2004 |
| JP | 2004-044451 | 2/2004 |
| JP | 2004-044452 | 2/2004 |
| JP | 2004-144094 | 5/2004 |
| JP | 2005-023920 | 1/2005 |
| JP | 2005-069178 | 3/2005 |
| JP | 2005-120927 | 5/2005 |
| JP | 2005-207337 | 8/2005 |
| JP | 2005-248799 | 9/2005 |
| JP | 2006-002568 | 1/2006 |
| JP | 2006-514526 | 4/2006 |
| JP | 2007309101 A * | 11/2007 |
| JP | 2008029166 A * | 2/2008 |
| WO | 84/04136 | 10/1984 |
| WO | 98-02652 | 1/1998 |
| WO | 98/30790 | 7/1998 |
| WO | 2005/024202 A1 | 3/2005 |
| WO | 2005/028876 A1 | 3/2005 |
| WO | WO 2005113961 A1 * | 12/2005 |

OTHER PUBLICATIONS

Co-pending U.S. Appl. No. 12/280,816, filed on Aug. 27, 2008 and U.S. Appl. No. 11/617,211, filed on Dec. 28, 2006.*

Microfilm of the specification and drawings annexed to the request of Japanese Utility Model Application No. 10710/1983 (Laid-open No. 116537/1984), Toyota Motor Corp, Aug. 6, 1984.

Microfilm of the specification and drawings annexed to the request of Japanese Utility Model Application No. 142414/1985 ( Laid-open No. 49629/1987), Nissan Motor Corp, Mar. 27, 1987.

Microfilm of the specification and drawings annexed to the request of Japanese Utility Model Application No. 115203/1986 (Laid-open No. 22301/1988), Nissan Motor Corp, Feb. 15, 1988.

Microfilm of the specification and drawings annexed to the request of Japanese Utility Model Application No. 134167/1984 (Laid-open No. 49126/1986), dated Apr. 2, 1986.

Search Report issued in European corresponding application No. 06026496.7, dated Feb. 10, 2009 and mailed Feb. 19, 2009.

Office Action issued in related Korean Patent Application No. 10-2007-0005555 (included herein in Korean and Japanese) dated Mar. 30, 2009.

* cited by examiner

FIG. 1

PRIOR ART

FIG. 4

MOTOR-DRIVEN SUPERCHARGER

This application claims priority from Japanese Patent Application No. 015261/2006, filed Jan. 24, 2006, the entire disclosure of which is incorporated herein by reference.

BACKGROUND OF THE INVENTION

1. Technical Field of the Invention

The present invention relates to a motor-driven supercharger provided with an electric motor assisting a rotational drive of a compressor, in a supercharger driven by an exhaust gas of an internal combustion engine so as to compress and supercharge an intake air.

2. Description of the Related Art

In order to improve a performance of an internal combustion engine, there has been widely used a supercharger (also called as "turbocharger") driven by an exhaust gas of the internal combustion engine so as to compress an intake air and supercharge. Further, there has been used a supercharger in which an acceleration response or the like is improved by incorporating an electric motor on the same axis as a shaft of a supercharger, and accelerating and assisting a rotational drive of a compressor. The supercharger having a motor-driven assist function by the electric motor is called as a motor-driven supercharger.

Figure 1:
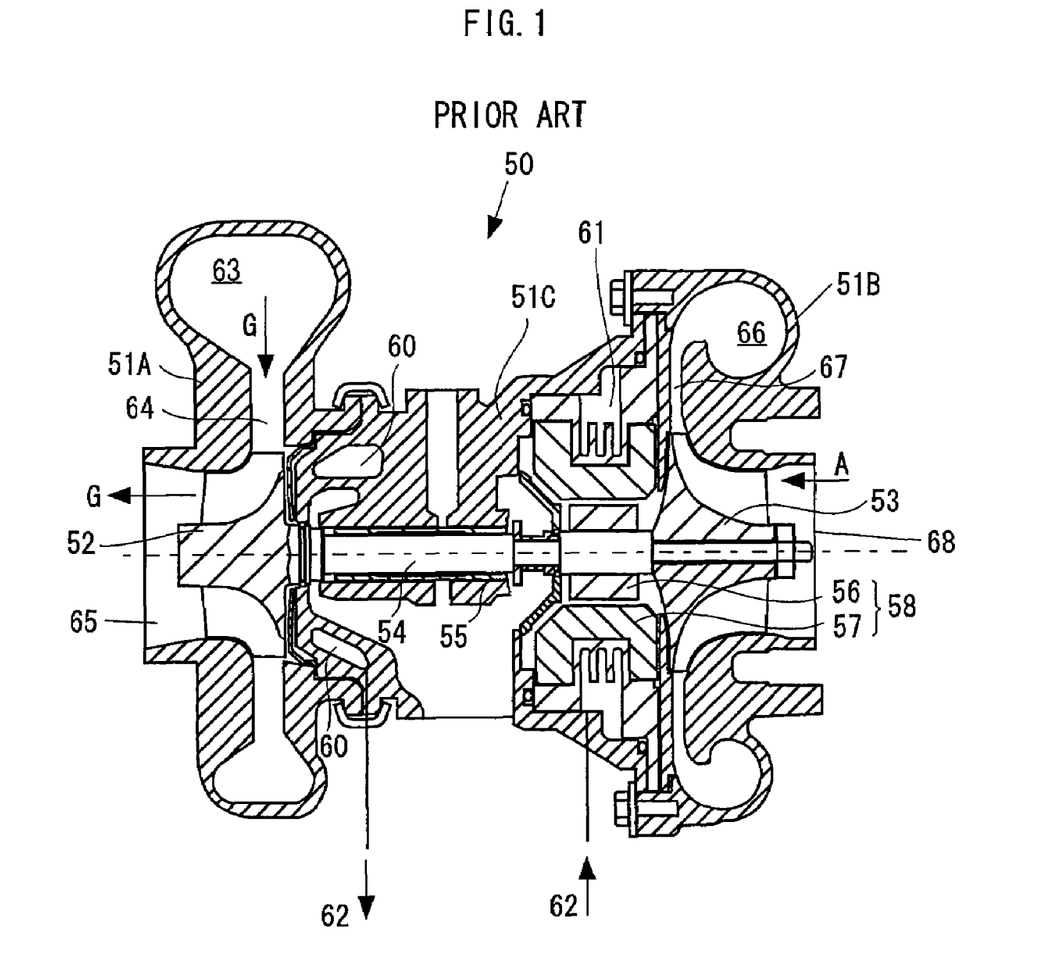
FIG. 1 is a view showing a skeleton structure of a conventional motor-driven supercharger.

FIG. 1 is a view showing a skeleton structure of a conventional motor-driven supercharger 50. A turbine impeller 52 and a turbine housing 51A surrounding it are arranged in an exhaust passage side of the supercharger 50. The turbine housing 51A has a scroll chamber 63 formed around the turbine impeller 52, and the scroll chamber 63 is communicated with the turbine impeller 52 via an annular gas flow path 64.

Further, an exhaust port 65 having the same axis as the turbine impeller 52 is formed in a center portion of the turbine housing 51A.

In an intake passage side of the motor-driven supercharger 50, there are arranged a compressor impeller 53 and a compressor housing 51B surrounding it.

The compressor housing 51B has a scroll chamber 66 formed around the compressor impeller 53, and the scroll chamber 66 is communicated with the compressor impeller 53 via an annularly formed diffuser 67.

Further, an intake port 68 having the same axis as the compressor impeller 53 is formed in a center portion of the compressor housing 51B.

The turbine impeller 52 and the compressor impeller 53 are coupled by a shaft 54. The shaft 54 is rotatably supported by a bearing 55 built in a center housing 51C.

Further, the center housing 51C has an electric motor 58 having a rotor 56 coaxially coupled to the shaft 54, and a stator 57 arranged around the rotor 56 built-in.

In the motor-driven supercharger 50 structured as mentioned above, if an exhaust gas from an internal combustion engine (an engine) is introduced to the scroll chamber 63, the exhaust gas flows to the exhaust port 65 via the annular gas flow path 64 and rotates the turbine impeller 52 in the process of passing through the turbine impeller 52. Accordingly, at the same time when the compressor impeller 53 coupled to the turbine impeller 52 via the shaft 54 is rotationally driven, the rotational drive is assisted by the electric motor 58, thereby accelerating an air sucked from the intake port by the compressor impeller 53. The accelerated air is decelerated and pressurized in the process of passing through the diffuser 67 so as to be introduced to the scroll chamber 66, and is discharged from a discharge portion (not shown) so as to be supplied to the internal combustion engine.

In the motor-driven supercharger 50 mentioned above, the electric motor 58 is rotated at a high speed and generates self-heating due to a windage loss or an eddy current loss during an operation of the supercharger. Further, since a high-temperature exhaust gas flows through the turbine, the electric motor 58 becomes high temperature by a heat conduction from the turbine impeller 52 to the shaft 54 and from the shaft 54 to the rotor 56 of the electric motor 58.

If the electric motor 58 becomes high temperature, a permanent magnet in an inner portion thereof is demagnetized or an efficiency of the electric motor 58 is lowered. Further, in the case that the electric motor 58 becomes high temperature so as to reach an operation upper limit temperature, it is impossible to drive the electric motor 58. Accordingly, it is impossible to utilize a motor-driven assist function.

Accordingly, in the supercharger 50, as shown in FIG. 1, a turbine side cooling fluid flow path 60 is formed at a position in a turbine side of the center housing, and a peripheral position thereof is cooled by flowing the cooling fluid through the turbine side cooling fluid flow path 60, and the heat transmission to the electric motor side is suppressed.

Further, in the supercharger 50, an electric motor side cooling fluid flow path 61 is formed in such a manner as to surround the electric motor 58, and the structure is made such as to flow a cooling fluid 62 through the electric motor side cooling fluid flow path 61 and suppress a temperature increase of the electric motor 58 on the basis of a cooling operation.

The turbine side cooling fluid flow path 60 and the electric motor side cooling fluid flow path 61 are communicated by a communication path (not shown) formed within the center housing, and the common cooling fluid 62 flows through both the flow paths.

In this case, there is a method in which systems of cooling fluid flow paths are independently provided in the turbine side and the electric motor side, and independently flow the cooling fluids, however, in the light of easiness of design, manufacturing or the like, there has been widely employed a method of using a common cooling fluid in the turbine side and the electric motor side such as the supercharger 50.

Further, in the motor-driven supercharger mentioned above, a radiator water is generally used as the cooling fluid 62 flowing through the cooling fluid flow paths 60 and 61. In this case, the temperature of the cooling fluid 62 is about 80° C. to 120° C. In general, the motor-driven supercharger does not have a high necessity for always driving the electric motor, but is designed on the basis of an idea that it is sufficient to achieve the motor-driven assist effect for a certain period of time. Accordingly, it is designed such that a cooling capacity of the cooling fluid 62 and the temperature increase of the electric motor 58 do not balance. Even if the cooling fluid is flowed through the electric motor side cooling fluid flow path 61, it is impossible to lower the temperature of the electric motor 58, and the temperature of the electric motor 58 is increased.

In other words, the supercharger 50 is structured such as to suppress the temperature increase of the electric motor 58 by flowing the cooling fluid 62 through the electric motor side cooling fluid flow path 61, and elongate a time (a continuous operation time) until the electric motor 58 reaches the upper limit temperature (for example, 180° C.), at the operating time of the electric motor 58.

In this case, as the motor-driven supercharger mentioned above, various proposals are made, for example, the following patent documents 1 and 2.

Patent Document 1: Japanese Unexamined Patent Publication No. 2004-3420

Patent Document 2: Japanese Unexamined Patent Publication No. 2000-130176

As mentioned above, in the motor-driven supercharger, the radiator water is generally used as the cooling fluid flowing through the cooling fluid flow paths 60 and 61. In this case, the temperature of the cooling fluid is about 80° C. to 120° C.

Accordingly, in the case that the temperature of the electric motor 58 is higher than the temperature of the cooling fluid such as a rated operation time, there is an effect of suppressing the temperature increase of the electric motor 58.

However, in the case that the temperature of the electric motor 58 is lower than the temperature of the cooling fluid 62, just after starting the operation or in a partial load state in which the rotating speed is lower than the rated operation, the electric motor 58 is heated by the cooling fluid 62, and a temperature difference to the upper limit temperature of the electric motor 58 is reduced. In other words, in this case, the cooling fluid 62 shortens the continuous operation time of the electric motor 58, and achieves an absolutely inverse function to the original purpose.

Further, the applicant of the present invention filed the patent application about the motor-driven supercharger in which the cooling fluid flow path is provided at a position surrounding the electric motor and being adjacent to the diffuser, and having the cooling structure combining both the cooling functions of the electric motor and the diffuser.

In the motor-driven supercharger combining the cooling of the electric motor and the cooling of the diffuser as mentioned above, the cooling fluid having the high temperature heats the diffuser having the low temperature, in the partial load in which the compressor discharge temperature becomes lower than the cooling fluid temperature.

As a result, the discharge air of the compressor is heated, and there is a case that the efficiency of the compressor is lowered.

SUMMARY OF THE INVENTION

The present invention is made by taking the circumstances mentioned above into consideration, and an object of the present invention is to provide a motor-driven supercharger which can effectively suppress a temperature increase of an electric motor so as to elongate a continuous operation time by properly achieving a temperature increase suppressing effect of the electric motor by a cooling fluid, and does not cause an efficiency reduction of a compressor even in the case of cooling the electric motor doubling as a diffuser.

In order to solve the problem mentioned above, the motor-driven supercharger in accordance with the present invention employs the following means.

In other words, in accordance with the present invention, there is provided a motor-driven supercharger which is provided with an electric motor accelerating and assisting a rotation of a compressor impeller within a center housing arranged between a turbine housing and a compressor housing, and has an electric motor side cooling fluid flow path circulating a cooling fluid so as to cool the electric motor, and a turbine side cooling fluid flow path circulating the common cooling fluid to the cooling fluid in the electric motor side cooling fluid flow path so as to cool a portion of the turbine impeller side of the center housing, wherein the motor-driven supercharger is provided with a cooling fluid flow rate adjusting device for adjusting a flow rate of the cooling fluid.

Further, the cooling fluid flow rate adjusting device sets the flow rate of the cooling fluid to a first flow rate for cooling the electric motor in a state where a temperature difference obtained by subtracting a temperature of the cooling fluid from a temperature of the electric motor is equal to or more than a predetermined temperature equal to or more than zero, and sets the flow rate of the cooling fluid to a second flow rate which is smaller than the first flow rate and is for suppressing a heating operation to the electric motor in a state where the temperature difference is lower than a predetermined temperature equal to or more than zero.

As mentioned above, since the cooling fluid flow rate adjusting device sets the flow rate of the cooling fluid to the second flow rate for suppressing the heating operation to the electric motor in the state where the temperature difference obtained by subtracting the temperature of the cooling fluid from the temperature of the electric motor is lower than the predetermined temperature equal to or more than zero, the heating of the electric motor by the cooling fluid is restricted to the minimum.

Further, in a partial load state in which the temperature of the electric motor is low, and the discharge air temperature of the compressor is lower than the temperature of the electric motor, the electric motor is cooled by the discharge air flowing into the electric motor side from the compressor side.

Since the turbine side of the center housing is adjacent to the turbine impeller into which the exhaust gas flows, and becomes a high temperature regardless of the operation state of the electric motor, it is necessary to flow a minimum cooling fluid necessary for cooling the turbine side. In this regard, since the second flow rate of cooling fluid is flowed even in the case that the temperature of the electric motor is low, in the cooling fluid flow rate adjusting device, it is possible to flow a certain flow rate of cooling fluid through the turbine side cooling fluid flow path so as to maintain the cooling in the turbine side of the center housing.

On the contrary, since the flow rate of the cooling fluid is set to the first flow rate for cooling the electric motor in the state where the temperature difference obtained by subtracting the temperature of the cooling fluid from the temperature of the electric motor is equal to or more than the predetermined temperature equal to or more than zero, the temperature increase of the electric motor is suppressed by the cooling operation of the cooling fluid.

As mentioned above, since it is possible to properly achieve the temperature increase suppressing effect of the electric motor by the cooling fluid, it is possible to effectively suppress the temperature increase of the electric motor. Accordingly, it is possible to elongate the time until reaching the operation upper limit temperature. In other words, it is possible to elongate the continuous operation time of the electric motor.

Accordingly, it is possible to make good use of the electric assist effect by the electric motor to the maximum.

Further, even in the motor-driven supercharger having the cooling structure provided with both of the cooling functions of the electric motor and the diffuser, since the flow rate of the cooling fluid is controlled as mentioned above, the cooling water is set to the second flow rate at a time of the partial load of the electric motor, and does not heat the compressor discharge air. Accordingly, an efficiency of the compressor is not lowered.

Further, in the motor-driven supercharger in accordance with the present invention, the cooling fluid flow rate adjusting device switches the flow rate of the cooling fluid from the second flow rate to the first flow rate in a case that the temperature difference is increased equal to or more than a first temperature difference higher than zero, and switches the flow rate of the cooling fluid from the first flow rate to the second flow rate in a case that the temperature difference is reduced equal to or less than a second temperature difference equal to or more than zero and lower than the first temperature difference.

As mentioned above, since a hysteresis is provided by switching by the first temperature difference in the case of switching the flow rate of the cooling fluid from the second flow rate to the first flow rate, and switching by the second temperature difference smaller than the first temperature difference in the case of switching the flow rate from the first flow rate to the second flow rate, it is possible to suppress a frequent switching motion (a chattering phenomenon).

Further, since the second temperature difference forming a standard of an inverse motion of switching the flow rate from the first flow rate to the second flow rate is set equal to or more than zero, the second flow rate of cooling fluid always flows in the case that the temperature of the electric motor is lower than the temperature of the cooling fluid. Accordingly, it is possible to securely suppress the heating of the electric motor by the cooling fluid.

Further, in the motor-driven supercharger in accordance with the present invention, the cooling fluid flow rate adjusting device has an opening and closing valve and a fixed orifice which are provided in parallel on a cooling fluid supply line supplying the cooling fluid to the center housing, and a controller controlling the opening and closing valve on the basis of the temperature of the electric motor and the temperature of the cooling fluid, the flow rate of the cooling fluid comes to the first flow rate in a state in which the opening and closing valve is open, and the flow rate of the cooling fluid comes to the second flow rate in a state in which the opening and closing valve is closed.

As mentioned above, since the first flow rate and the second flow rate are controlled by the opening and closing valve and the fixed orifice, it is easy to control the flow rate of the cooling fluid.

In accordance with the present invention, there can be obtained an excellent effect that the efficiency reduction of the compressor is not caused even in the case of being provided with both of the cooling of the electric motor and the cooling of the diffuser, as well as it is possible to effectively suppress the temperature increase of the electric motor so as to elongate the continuous operation time by properly achieving the temperature increase suppressing effect of the electric motor by the cooling fluid.

The other objects and advantages of the present invention will become apparent from the following description with reference to the accompanying drawings.

DESCRIPTION OF THE PREFERRED EMBODIMENTS

A description will be in detail given below of preferable embodiments in accordance with the present invention with reference to the accompanying drawings. In this case, the same reference numerals are attached to common parts in each of the drawings, and an overlapping description will be omitted.

First Embodiment

A description will be given below of a first embodiment in accordance with the present invention.

Figure 2:
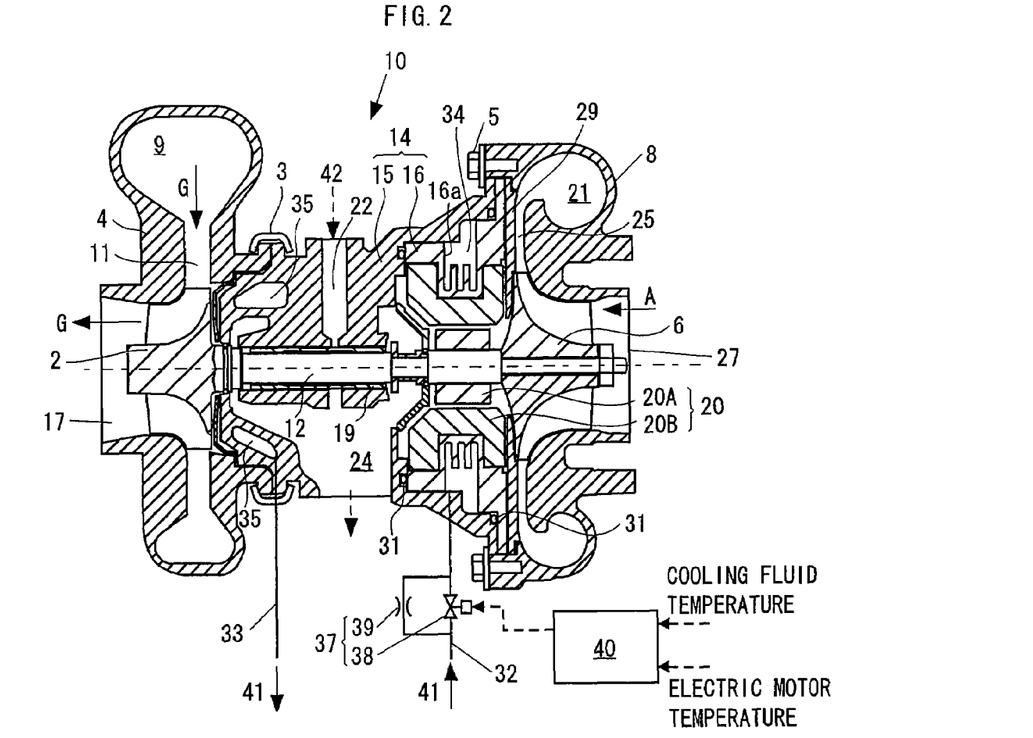
FIG. 2 is a view showing a skeleton structure of a motor-driven supercharger in accordance with a first embodiment of the present invention.

FIG. 2 is a view showing a skeleton structure of a motor-driven supercharger in accordance with the first embodiment of the present invention. As shown in FIG. 2, a motor-driven supercharger 10 is constituted by elements such as a turbine impeller 2, a turbine housing 4, a shaft 12, a compressor impeller 6, a compressor housing 8, an electric motor 20, a center housing 14 and the like.

In an exhaust passage side, there are arranged the turbine impeller 2 rotationally driven by an exhaust gas G of an internal combustion engine, and the turbine housing 4 surrounding the turbine impeller 2.

The turbine housing 4 has a scroll chamber 9 formed in the periphery of the turbine impeller 2, and the scroll chamber 9 is communicated with the turbine impeller 2 via an annular gas flow path 11.

Further, in the turbine housing 4, an exhaust port 17 having the same axis as the turbine impeller 2 is formed in a center portion.

In an intake side passage, there are arranged the compressor impeller 6 compressing an intake air, and the compressor housing 8 surrounding the compressor impeller 6.

The compressor housing 8 has a scroll chamber 21 formed annularly around the compressor impeller 6 and discharging a compressed air A.

Between an outlet of the compressor impeller 6 and the scroll chamber 21, there is formed an annular diffuser 25 extending to an outer side in a radial direction from an outlet of the compressor impeller 6 so as to communicate therebetween, thereby decelerating and pressurizing the air A accelerated by the compressor impeller 6 so as to introduce to the scroll chamber 21.

Further, in the compressor housing 8, an intake port 27 having the same axis as the compressor impeller 6 is formed in a center portion.

The turbine impeller 2 and the compressor impeller 6 are coupled by a shaft 12, and the shaft 12 is rotatably supported by a bearing 19 built in the center housing 14.

The turbine housing 4 and the center housing 14 are coupled by a coupling 3, and the compressor housing 8 and the center housing are coupled by a bolt 5.

The electric motor 20 is built in the center housing 14, is arranged at a position adjacent to the compressor impeller 6. The electric motor 20 is constituted by a rotor 20A coupled coaxially with the shaft 12, rotating together with the shaft 12 and constituted by a permanent magnet, and a stator 20B arranged around the rotor 20A and constituted by a coil.

In the center housing 14, there are formed an oil supply path 22 for supplying a lubricating oil 42 to a bearing 16, and an oil discharge path 24 for discharging the lubricating oil 42 passing through an inner portion of the bearing 16 so as to lubricate and cool a bearing 19.

The structure is made such that the lubricating oil 42, for example, having a temperature about 80° C. is supplied to the oil supply path 22 by a lubricating oil pump (not shown) installed in an outer portion.

A disc-shaped seal plate 29 is interposed between the center housing 14 and the compressor housing 8.

In this case, in the present embodiment, the flow path forming member 16 and the seal plate 29 are structured as independent bodies, however, they may be constituted by an integrally structure member.

The center housing 14 is provided with a housing main body 15 and the flow path forming member 16, and has an electric motor side cooling fluid flow path 34 between the housing main body 15 and the flow path forming member 16.

The flow path forming member 16 has an annular concave portion 16a for circulating the cooling fluid, is formed in a ring shape as a whole, and is fitted to the housing main body 15 so as to be inserted and attached. Further, the electric motor side cooling fluid flow path 34 circulating a cooling fluid 41 is defined by the housing main body 15 and the annular concave portion 16a of the flow path forming member 16.

Further, a position in the electric motor side of the annular concave portion 16a is formed in a fin shape, thereby increasing an efficiency of a heat conduction.

An O-ring 31 is interposed between the housing main body 15 and the flow path forming member 16, and a portion therebetween is held in a water tight.

The electric motor side cooling fluid flow path 34 extends in a peripheral direction within the center housing 14 so as to be formed annularly, and is structured such as to circulate the cooling fluid 41 for cooling the electric motor 20 in an inner portion.

The electric motor side cooling fluid flow path 34 may be formed in such a manner as to completely make a circuit of an outer periphery of the electric motor 20, or may be formed in a C shape as seen from an axial direction of the shaft 12.

A cooling fluid supply line 32 supplying the cooling fluid 41 to the electric motor side cooling fluid flow path 34 is connected to the center housing 14.

A cooling fluid pump (not shown) is connected to an upstream side of the cooling fluid supply line 32, whereby the cooling fluid 41 is supplied. In the present embodiment, the cooling water 41 is constituted by a radiator water, and a temperature thereof is about 80° C. to 120° C.

An annular turbine side cooling water flow path 35 is formed in the turbine impeller 2 side of the center housing 14 so as to surround the shaft 12.

The turbine side cooling fluid flow path 35 may be formed in such a manner as to completely make a circuit of the periphery of the shaft 12, or may be formed in a C shape as seen from an axial direction of the shaft 12.

Further, the turbine side cooling fluid flow path 35 is communicated with the electric motor side cooling fluid flow path 34 by a communication path (not shown) formed within the center housing 14, and is structured such that the cooling fluid 41 passing through the electric motor side cooling flow path 34 flows into the turbine side cooling fluid flow path 35 via the communication path. In other words, the motor-driven supercharger 10 is structured such that the common cooling fluid 41 is circulated in the electric motor side cooling fluid flow path 34 and the turbine side cooling fluid flow path 35.

A cooling fluid discharge line 33 discharging the cooling fluid 41 from the turbine side cooling fluid flow path 35 is connected to the center housing 14.

Further, the motor-driven supercharger 10 in accordance with the present embodiment is provided with a flow rate adjuster 37 and a controller 40.

In the present embodiment, a flow rate adjuster 37 is constituted by an opening and closing valve 38 and a fixed orifice 39 which are arranged in parallel on the cooling fluid supply line 32, and is structured such that a flow rate of the cooling fluid 41 comes to a first flow rate (hereafter this is called "a large flow rate") in a state in which the opening and closing valve 38 is open, and the flow rate of the cooling fluid 41 comes to a second flow rate (hereafter this is called "a small flow rate") in a state in which the opening and closing valve 38 is closed. In other words, the flow rate of the cooling fluid 41 supplied to the electric motor side cooling fluid flow path 34 is switched to the large flow rate and the small flow rate by opening and closing the opening and closing valve 38.

The controller 40 has a function of controlling the opening and closing of the opening and closing valve 38 on the basis of the temperature of the cooling fluid and the temperature of the electric motor. The structure is made such that the cooling fluid temperature measured by a temperature meter (not shown) of the radiator water, and a temperature signal of the electric motor temperature measured by an electric motor temperature meter (not shown) are input to the controller 40.

In the present embodiment, on the basis of the flow rate adjuster 37 and the controller 40, the flow rate of the cooling fluid 41 is set to the large flow rate in a state where a temperature difference obtained by subtracting a temperature of the cooling fluid 41 from a temperature of the electric motor 20 is equal to or more than a predetermined temperature equal to or more than zero, and the flow rate of the cooling fluid 41 is set to the small flow rate in a state where the temperature difference is lower than a predetermined temperature equal to or more than zero. In other words, in the present embodiment, the flow rate adjuster 37 and the controller 40 serve as a cooling fluid flow rate adjusting device capable of adjusting the flow rate of the cooling fluid. In the present description, hereafter, a temperature difference between the electric motor 20 and the cooling fluid 41 shall mean the temperature difference obtained by subtracting the temperature of the cooling fluid 41 from the temperature of the electric motor 20.

Figure 3:
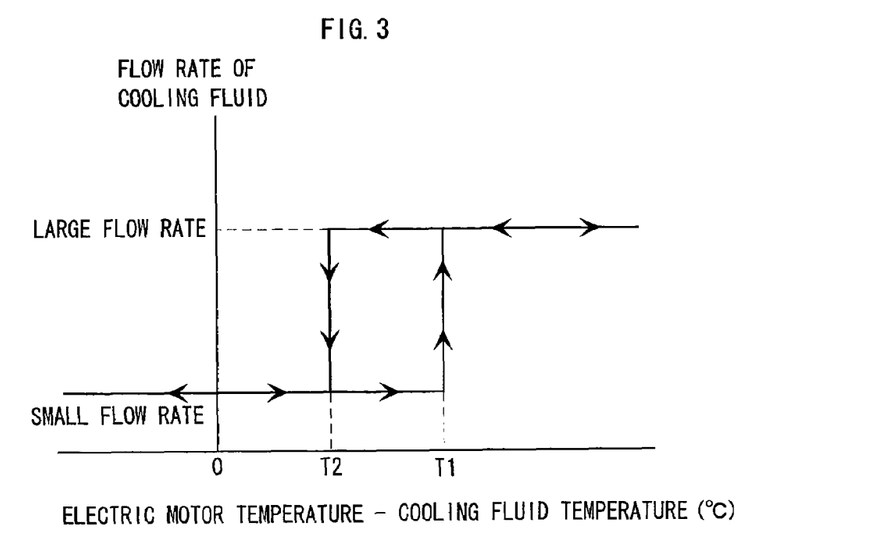
FIG. 3 is a view explaining a flow rate control of a cooling fluid by a flow rate adjuster and a controller.

FIG. 3 is a view explaining the flow rate control of the cooling fluid 41 by the flow rate adjuster 37 and the controller 40. In this drawing, a horizontal axis indicates the temperature difference between the electric motor 20 and the cooling fluid 41, and a vertical axis indicates a flow rate of the cooling fluid supplied to the electric motor side cooling fluid flow path 34.

As shown in this drawing, on the basis of the flow rate adjuster 37 and the controller 40, the flow rate of the cooling fluid 41 is switched from the small flow rate to the large flow rate in a case that the temperature difference between the electric motor 20 and the cooling fluid 41 is increased equal to or more than a first temperature difference T1 which is larger than zero. Further, the flow rate of the cooling fluid 41 is switched from the large flow rate to the small flow rate in a case that the temperature difference between the electric motor 20 and the cooling fluid 41 is decreased equal to or less than a second temperature difference T2 which is equal to or more than zero and is smaller than the first temperature difference T1.

The first temperature difference T1 is, for example, 4° C., and the second temperature difference is, for example, 2° C. In addition, the second temperature difference may be zero.

The large flow rate mentioned above is set to equal to or more than sufficient flow rate for suppressing the temperature increase of the electric motor 20 on the basis of the cooling effect of the cooling fluid 41.

It is necessary to suppress the heating operation to the electric motor 20 in the state where the temperature of the electric motor 20 is lower than the temperature of the cooling fluid 41. On the other hand, since the turbine side of the center housing 14 is adjacent to the turbine impeller 2 into which the exhaust gas G flows, and comes to a high temperature regardless of the operating state of the electric motor 20, it is necessary to flow the minimum cooling fluid 41 necessary for cooling the turbine side. Accordingly, the small flow rate mentioned above is smaller than the large flow rate and is set to such a minimum flow rate as to be capable of suppressing the heating operation to the electric motor 20 and maintaining the cooling in the turbine side of the center housing 14 to the minimum.

Next, a description will be given of an operation of the motor-driven supercharger 10 structured as mentioned above.

In the motor-driven supercharger 10, if the exhaust gas G from an internal combustion engine (an engine) is introduced to the scroll chamber 9, the exhaust gas G flows to the exhaust port 17 via the annular gas flow path 11 so as to rotate the turbine impeller 2 in the process of passing through the turbine impeller 2.

Then, the rotational drive is assisted by the electric motor 20 at the same time when the compressor impeller 6 coupled to the turbine impeller 2 via the shaft 12 is rotationally driven, thereby accelerating the air A sucked from the intake port 27 by the compressor impeller 6.

The accelerated air A is decelerated and pressurized in the process of passing through the diffuser 25 so as to be introduced to the scroll chamber 21, and is discharged from a discharge portion (not shown) so as to be supplied to the internal combustion engine.

Further, the cooling fluid 41 is supplied to the electric motor side cooling fluid flow path 34 and the turbine side cooling fluid flow path 35 from the cooling fluid supply line 32.

In the state where the difference temperature between the electric motor 20 and the cooling fluid 41 is lower than the first temperature difference T1 just after starting the operation of the electric motor 20 or at a time of a partial load, the flow rate of the cooling fluid 41 is set to the small flow rate by the flow rate adjuster 37 under the control by the controller 40. Accordingly, the heating operation to the electric motor 20 by the cooling fluid 41 is restricted to the minimum.

Further, in a partial load state in which the temperature of the electric motor 20 is low, and the temperature of the discharge air of the compressor is lower than the temperature of the electric motor 20, the electric motor 20 is cooled by the discharge air flowing into the electric motor 20 side from the compressor side. Accordingly, the temperature of the electric motor 20 is kept at the low temperature.

If the electric motor 20 comes to a steady operation state, the temperature of the electric motor is going to be increased, and the temperature difference between the electric motor 20 and the cooling fluid 41 is increased equal to or more than the first temperature difference T1, the flow rate of the cooling fluid 41 is switched from the small flow rate to the large flow rate by the flow rate adjuster 37 under the control by the controller 40. Accordingly, the temperature increase of the electric motor 20 is suppressed by the cooling operation of the cooling fluid 41.

Further, if the electric motor temperature is going to be decreased, and the temperature difference between the electric motor 20 and the cooling fluid 41 is decreased equal to or less than the second temperature difference T2, the flow rate of the cooling fluid 41 is switched from the large flow rate to the small flow rate by the flow rate adjuster 37 under the control by the controller 40. Accordingly, since the heating operation to the electric motor 20 by the cooling fluid 41 is restricted to the minimum, and the electric motor 20 is cooled by the discharge air flowing into the electric motor 20 side from the compressor side, the temperature of the electric motor 20 is kept at the low temperature.

Next, a description will be given of an operation and an effect of the motor-driven supercharger 10 in accordance with the present embodiment.

In accordance with the motor-driven supercharger 10 on the basis of the present embodiment, since the flow rate of the cooling fluid 41 is set to the small flow rate by the flow rate adjuster 37 and the controller 40 (the cooling fluid flow rate adjusting device) in the state where the difference temperature between the electric motor 20 and the cooling fluid 41 is lower than the predetermined temperature equal to or more than zero, the heating operation to the electric motor 20 by the cooling fluid 41 is restricted to the minimum.

Further, since the electric motor 20 is cooled by the discharge air flowing into the electric motor 20 side from the compressor side, in the partial load state in which the temperature of the electric motor 20 is low and the discharge air temperature is lower than the temperature of the electric motor 20, it is possible to keep the temperature of the electric motor 20 at the low temperature.

Further, since the small flow rate of cooling fluid 41 is flowed even in the case that the temperature of the electric motor 20 is low, it is possible to maintain the cooling in the turbine side of the center housing 14 by flowing a certain flow rate of cooling fluid 41 through the turbine side cooling fluid flow path 35.

On the other hand, since the flow rate of the cooling fluid 41 is set to the large flow rate in the state where the difference temperature between the electric motor 20 and the cooling fluid 41 is equal to or more than the predetermined temperature equal to or more than zero, it is possible to suppress the temperature increase of the electric motor 20 by the cooling operation of the cooling fluid 41.

As mentioned above, since it is possible to properly achieve the temperature increase suppressing effect of the electric motor 20 by the cooling fluid 41, it is possible to effectively suppress the temperature increase of the electric motor 20. Accordingly, it is possible to elongate the time until reaching the operation upper limit temperature. In other words, it is possible to elongate the continuous operation time of the electric motor 20.

Accordingly, it is possible to make good use of the effect of the motor-driven assist by the electric motor to the maximum.

Further, in accordance with the motor-driven supercharger 10 on the basis of the present embodiment, since a hysteresis is provided by switching by the first temperature difference T1 in the case of switching the flow rate of the cooling fluid 14 from the small flow rate to the large flow rate, and switching by the second temperature difference T2 smaller than the first temperature difference T1 in the case of switching the flow rate from the large flow rate to the small flow rate, it is possible to suppress a frequent switching motion (a chattering phenomenon).

Further, since the second temperature difference T2 forming a standard of an inverse motion of switching the flow rate from the large flow rate to the small flow rate is set equal to or more than zero, the small flow rate of cooling fluid 41 always flows in the case that the temperature of the electric motor 20 is lower than the temperature of the cooling fluid 41. Accordingly, it is possible to securely suppress the heating operation to the electric motor 20 by the cooling fluid 41.

Further, since the small flow rate and the large flow rate are controlled by the opening and closing valve 38 and the fixed orifice 39, it is easy to control the flow rate of the cooling fluid 41.

Second Embodiment

A description will be given below of a second embodiment in accordance with the present invention.

Figure 4:
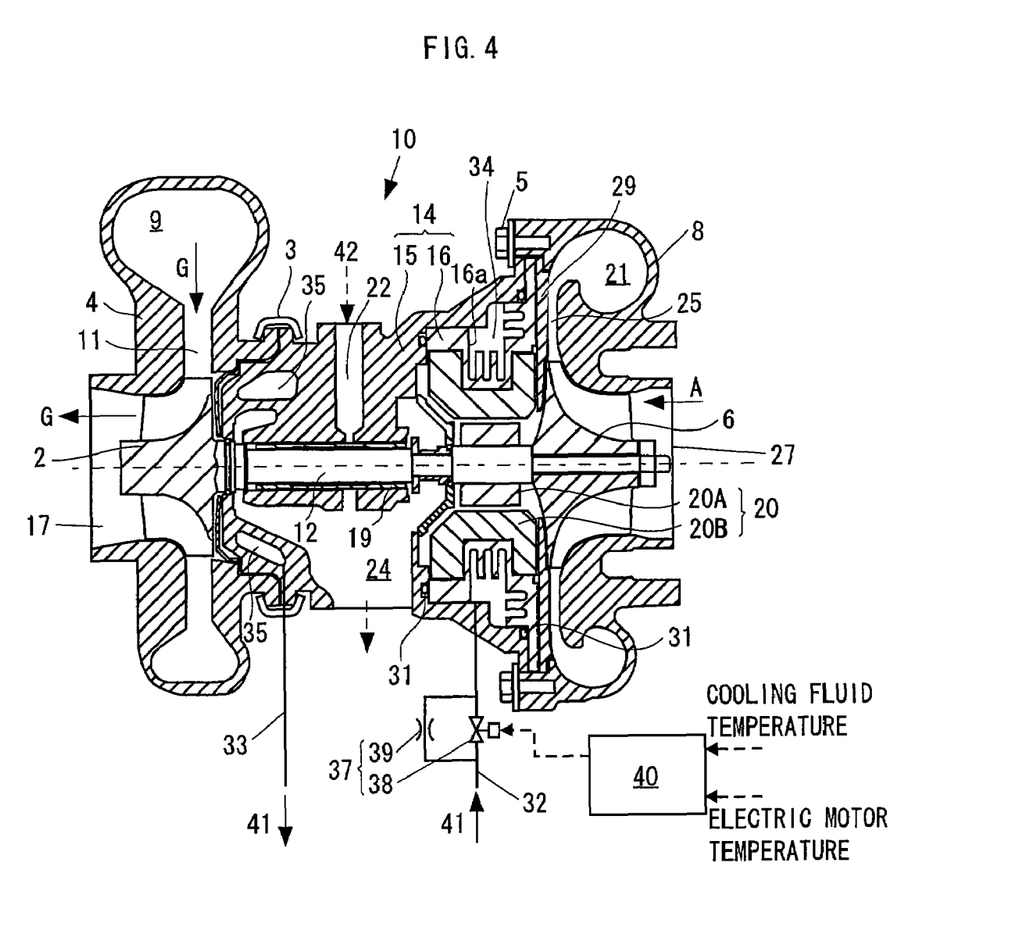
FIG. 4 is a view showing a skeleton structure of a motor-driven supercharger in accordance with a second embodiment of the present invention.

FIG. 4 is a view showing a skeleton structure of a motor-driven supercharger 10 in accordance with the second embodiment of the present invention.

In the present embodiment, a position in the diffuser 25 side of the flow path forming member 16 is structured such that a heat exchange can be executed between the cooling fluid 41 flowing through the electric motor side cooling fluid flow path 34 and the air A flowing through the diffuser 25. Further, a position in the diffuser 25 side of the flow path forming member 16 is formed in a fin shape so as to increase an efficiency of a heat conduction by expanding a heat transfer area.

A thickness of a member constituting the heat conduction position is set in such a manner as to sufficiently execute the heat exchange between the cooling fluid and the diffuser 25.

On the basis of the structure mentioned above, the heat exchange is executed between the cooling fluid 41 flowing through the cooling fluid flow path 34 and the electric motor 20, and between the cooling fluid 41 and the diffuser 25, thereby cooling both of the electric motor 20 and the diffuser 25.

In other words, the motor-driven supercharger 10 in accordance with the present embodiment has a cooling structure provided with both the cooling functions of the electric motor 20 and the diffuser 25.

The structures of the other portions of the motor-driven supercharger 10 in accordance with the present embodiment are similar to the first embodiment mentioned above.

Next, a description will be given of a motion, an operation and an effect of the motor-driven supercharger 10 in accordance with the present embodiment.

In the motor-driven supercharger 10 in accordance with the present embodiment, in the same manner as the first embodiment, the turbine impeller 2 is rotated by the exhaust gas G from the internal combustion engine, the compressor impeller 6 coupled thereto is rotationally driven, and the air A is compressed so as to be supplied to the internal combustion engine. At this time, the rotation of the compressor impeller 6 is assisted on the basis of the motor-driven assist by the electric motor 20.

Further, the cooling fluid 41 is supplied to the electric motor side cooling fluid flow path 34 and the turbine side cooling fluid flow path 35 from the cooling fluid supply line 32. The flow rate control of the cooling fluid by the flow rate adjuster 37 and the controller 40 at this time is the same as the first embodiment.

In other words, in the state where the difference temperature between the electric motor 20 and the cooling fluid 41 is lower than the first temperature difference T1 just after starting the operation of the electric motor 20 or at a time of the partial load, the flow rate of the cooling fluid 41 is set to the small flow rate by the flow rate adjuster 37 under the control by the controller 40. Further, if the temperature difference between the electric motor 20 and the cooling fluid 41 is increased equal to or more than the first temperature difference T1 which is larger than zero, the flow rate of the cooling fluid 41 is switched from the small flow rate to the large flow rate. Further, in the case that the temperature difference between the electric motor 20 and the cooling fluid 41 is decreased equal to or less than the second temperature difference T2 which is equal to or more than zero and smaller than the first temperature difference T1, the flow rate of the cooling fluid 41 is switched from the large flow rate to the small flow rate.

Since the flow rate of the cooling fluid 41 is controlled as mentioned above, the flow rate of the cooling fluid 41 flowing through the electric motor side cooling fluid flow path 34 is small even at a time of the partial load that the compression discharge temperature becomes lower than the cooling water temperature. Accordingly, the air flowing through the diffuser is not heated by the cooling fluid 41.

As mentioned above, even in the motor-driven supercharger having the cooling structure provided with both the cooling functions of the electric motor 20 and the diffuser 25 such as the present embodiment, the cooling fluid 41 does not heat the compressor discharge air at a time of the partial load of the electric motor 20. Accordingly, the efficiency of the compressor is not lowered.

As is apparent from the description of each of the embodiments mentioned above, in accordance with the present invention, there can be obtained an excellent effect that the efficiency reduction of the compressor is not caused even in the case that the cooling of the electric motor and the cooling of the diffuser are combined, as well as it is possible to effectively suppress the temperature increase of the electric motor so as to elongate the continuous operation time by properly achieving the temperature increase suppressing effect of the electric motor by the cooling fluid.

Other Embodiments

The embodiments mentioned above are applied to the motor-driven supercharger in which the bearing 19 of the shaft 12 is arranged in the turbine side, and the electric motor 20 is arranged in the compressor side, however, the applied range of the present invention is not limited to this, but the present invention can be of course applied to a motor-driven supercharger of a type that an electric motor is arranged in a center portion and bearings are arranged in both sides thereof, for example, disclosed in Japanese Unexamined Patent Publication No. 2003-293785.

In the embodiments mentioned above, the flow rate adjuster 37 is constituted by the opening and closing valve 38 and the fixed orifice 39, however, the structure may be made such that the large flow rate and the small flow rate are adjusted by a flow rate adjusting valve.

In addition, it goes without saying that the present invention is not limited to the embodiments mentioned above, but can be variously modified within the scope of the present invention.

What is claimed is:

1. A motor-driven supercharger comprising:
   (a) an electric motor disposed to accelerate and assist rotation of a compressor impeller, wherein the electric motor is disposed within a center housing and wherein the center housing is arranged between a turbine housing and a compressor housing;
   (b) an electric motor side cooling fluid flow path arranged to flow cooling fluid so as to cool the electric motor;
   (c) a turbine side cooling fluid flow path arranged to flow cooling fluid coming from the electric motor side cooling fluid flow path and to circulate cooling fluid so as to cool a portion of a turbine impeller side of the center housing, wherein a turbine impeller is disposed on the turbine impeller side of the center housing; and (d) a cooling fluid flow rate adjusting device for adjusting a flow rate of cooling fluid, wherein the cooling fluid flow rate adjusting device comprises
  i. a flow rate adjuster arranged to supply cooling fluid via the electric motor side cooling fluid flow path, and arranged on a cooling fluid supply line that supplies cooling fluid to the center housing, wherein the flow rate adjuster is operable to switch a first flow rate and a second flow rate; and
  ii. a controller disposed to control the flow rate adjuster, wherein the controller receives a signal of a temperature of cooling fluid from a first temperature meter and a signal of a temperature of the electric motor from an electric motor temperature meter, wherein the controller operates to control the flow rate adjuster to set the flow rate of cooling fluid to the first flow rate for cooling the electric motor in a first temperature state when a temperature difference obtained by subtracting the temperature of cooling fluid from the temperature of the electric motor is equal to, or more than, a predetermined temperature that is equal to or greater than zero, and the controller operates to control the flow rate adjuster to set the flow rate of cooling fluid to the second flow rate that is smaller that the first flow rate and that is used for suppressing a heating operation of the electric motor in a second temperature state when the temperature difference is lower than the predetermined temperature that is equal to or greater than zero,
wherein the flow rate adjuster has an opening and closing valve and a fixed orifice that are provided in parallel on the cooling fluid supply line, and the controller controls the opening and closing valve on the basis of the temperature of the electric motor and the temperature of cooling fluid, wherein the flow rate of cooling fluid comes to the first flow rate in a first valve state in which the opening and closing valve is open, and the flow rate of cooling fluid comes to the second flow rate in a second valve state in which the opening and closing valve is closed.

2. The motor-driven supercharger as claimed in claim 1,
wherein the cooling fluid flow rate adjusting device switches the flow rate of cooling fluid from the second flow rate to the first flow rate when the temperature difference is increased to equal to or greater than a first temperature difference higher than zero, and
the cooling fluid flow rate adjusting device switches the flow rate of cooling fluid from the first flow rate to the second flow rate when the temperature difference is reduced to equal to or less than a second temperature difference equal to or greater than zero and lower than the first temperature difference.

* * * * *